United States Patent
Fukutomi et al.

(10) Patent No.: US 10,112,132 B2
(45) Date of Patent: Oct. 30, 2018

(54) OIL ADDITIVE AND OIL FILTER

(71) Applicants: Ippei Fukutomi, Machida (JP);
Motoichi Murakami, Gotenba (JP);
Katsuichi Miyasaka, Gotenba (JP);
Hideto Morishita, Gifu (JP); Yasuhiro Saito, Tokoname (JP)

(72) Inventors: Ippei Fukutomi, Machida (JP);
Motoichi Murakami, Gotenba (JP);
Katsuichi Miyasaka, Gotenba (JP);
Hideto Morishita, Gifu (JP); Yasuhiro Saito, Tokoname (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 107 days.

(21) Appl. No.: 14/373,398

(22) PCT Filed: Jan. 21, 2013

(86) PCT No.: PCT/IB2013/000067
§ 371 (c)(1),
(2) Date: Jul. 21, 2014

(87) PCT Pub. No.: WO2013/110991
PCT Pub. Date: Aug. 1, 2013

(65) Prior Publication Data
US 2015/0008170 A1      Jan. 8, 2015

(30) Foreign Application Priority Data

Jan. 23, 2012    (JP) .................................. 2012-010909

(51) Int. Cl.
*B01D 35/00*      (2006.01)
*F01M 1/10*       (2006.01)
(Continued)

(52) U.S. Cl.
CPC .......... *B01D 35/005* (2013.01); *B01D 15/08* (2013.01); *C10M 163/00* (2013.01); *F01M 1/10* (2013.01);
(Continued)

(58) Field of Classification Search
CPC .... B01D 2239/0407; B01D 2239/0618; B01D 15/08; B01D 35/005; F01M 9/02;
(Continued)

(56) References Cited

U.S. PATENT DOCUMENTS 4,340,493 A      7/1982   Miyata
5,602,084 A *    2/1997   Moreton .............. C10M 159/20
                                                     508/391

(Continued)

FOREIGN PATENT DOCUMENTS

CA    EP 0210030 A2 *   1/1987   .......... C10M 141/10
CN       101227962 A     7/2008
(Continued)

OTHER PUBLICATIONS

Derwent Abstract for Japanese Patent Application 03-296408 to Azure et al published Feb. 2000, two pages.*

(Continued)

*Primary Examiner* — Matthew O Savage
(74) *Attorney, Agent, or Firm* — Hunton Andrews Kurth LLP

(57) ABSTRACT

An oil additive includes a hydrotalcite-like compound, and a radical trapping agent having a melting point of 130° C. or higher.

10 Claims, 10 Drawing Sheets

(51) Int. Cl.
*C10M 163/00* (2006.01)
*B01D 15/08* (2006.01)

(52) U.S. Cl.
CPC ............... *B01D 2239/0407* (2013.01); *C10M 2201/062* (2013.01); *C10M 2201/103* (2013.01); *C10M 2207/024* (2013.01); *C10M 2207/026* (2013.01); *C10M 2215/08* (2013.01); *C10M 2215/222* (2013.01); *C10M 2215/223* (2013.01); *C10M 2223/049* (2013.01); *C10N 2230/04* (2013.01); *C10N 2230/10* (2013.01); *C10N 2230/52* (2013.01); *C10N 2230/72* (2013.01); *C10N 2240/10* (2013.01); *C10N 2250/16* (2013.01); *F01M 2001/1014* (2013.01)

(58) Field of Classification Search
CPC .. F01M 11/03; F01M 2001/1014; F01M 1/10; C10M 2207/026; C10M 2201/103; C10M 2223/049; C10M 2201/062; C10N 2230/10
See application file for complete search history.

(56) References Cited

U.S. PATENT DOCUMENTS

| | | | |
|---|---|---|---|
| 6,024,880 A | 2/2000 | Ciora, Jr. et al. | |
| 7,262,319 B2* | 8/2007 | Rehm | C07C 67/52 |
| | | | 252/182.31 |
| 8,772,208 B2* | 7/2014 | Fukutomi | C10M 125/10 |
| | | | 508/154 |
| 2002/0014447 A1* | 2/2002 | Rohrbach | B01D 27/02 |
| | | | 210/209 |
| 2004/0014614 A1* | 1/2004 | Burrington | C10M 165/00 |
| | | | 508/287 |
| 2005/0170978 A1* | 8/2005 | Migdal | C10M 141/08 |
| | | | 508/497 |
| 2006/0260874 A1 | 11/2006 | Lockledge et al. | |
| 2007/0032581 A1 | 2/2007 | Stoll et al. | |
| 2010/0016196 A1* | 1/2010 | Gelbin | C07F 9/65744 |
| | | | 508/422 |

FOREIGN PATENT DOCUMENTS

| | | |
|---|---|---|
| EP | 0063631 A1 | 11/1982 |
| JP | 56-129297 A | 10/1981 |
| JP | 57-2359 A | 1/1982 |
| JP | 03-296408 A | 12/1991 |
| JP | 2001-020714 A | 1/2001 |
| JP | 2001089784 A | 4/2001 |
| JP | 2008-540123 A | 11/2008 |
| JP | 2010-145107 A | 7/2010 |
| WO | 00/53705 A1 | 9/2000 |
| WO | 2005/066320 A1 | 7/2005 |
| WO | 2006/127652 A2 | 11/2006 |

OTHER PUBLICATIONS

PubChem Compound Database, Compound summary for CID 93115, 1,3,5-tris(3,5-di-tert-butyl-4-hydroxybenzyl)-1,3,5-triazinane-2,4,6-trione. [Retrieved on Mar. 23, 2018]. Retrieved from the internet: <URL: https://pubchem.ncbi.nlm.nih.gov/compound/27676-62-6#section=Top>.*
ChemicalBook, Ultraviolet Absorbent UV-360, 2,2'-Methylenebis[6-(benzotriazol-2-yl)-4-tert-octylphenol]. [retrieved on Mar. 23, 2018]. Retrieved from the Internet: <URL: https://www.chemicalbook.com/ChemicalProductProperty_EN_CB3283802.htm>.*
Office Action dated Jul. 31, 2013 issued in U.S. Appl. No. 13/379,877.
Final Office Action dated Nov. 12, 2013, issued in U.S. Appl. No. 13/379,877.

* cited by examiner

OIL ADDITIVE AND OIL FILTER

CROSS-REFERENCE TO RELATED APPLICATIONS

This is a national phase application based on the PCT International Patent Application No. PCT/IB2013/000067 filed Jan. 21, 2013, claiming priority to Japanese patent application No. 2012-010909 filed Jan. 23, 2012, the entire contents of both of which are incorporated herein by reference.

BACKGROUND OF THE INVENTION

1. Field of the Invention

The invention relates to an oil additive that can be used in a machine, such as an internal combustion engine, and also relates to an oil filter including the oil additive.

2. Description of Related Art

Various kinds of oil additive agents are put into oil used in a machine, such as an internal combustion engine, so as to curb deterioration of the oil, for example. As one example of the additive agents, zinc dialkyldithiophosphate, or ZnDTP, having an ability to prevent oxidation, an ability to prevent corrosion, an ability to prevent wear, etc., is added to oil.

Japanese Patent Application Publication No. 56-129297 (JP 56-129297 A) discloses the use of a hydrotalcite-like compound expressed in the following formula (1) as an oil additive agent.

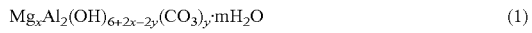

$$Mg_xAl_2(OH)_{6+2x-2y}(CO_3)_y \cdot mH_2O \qquad (1)$$

In the above formula (1), x and y are integers that satisfy 3<x<20 and 0<y<2, respectively, and m is an integer. As described in JP 56-129297 A, the hydrotalcite-like compound expressed in the above formula (1) has a characteristic of reacting quickly with undesirable acid pollutants in oil, within the oil, as compared with known basifying agents.

Japanese Patent Application Publication No. 3-296408 (JP 3-296408 A) discloses filter media for a bypass oil filter for an internal combustion engine. The filter media contains the hydrotalcite-like compound expressed in the above formula (1). As described in JP 3-296408 A, fine particles, such as those of the hydrotalcite-like compound, have an acid/alkali adsorption ability, and serve to adsorb acid substances generated in the internal combustion engine, so as to prevent deterioration of oil.

Since the hydrotalcite-like compound has an elution property, the acid substances adsorbed by the hydrotalcite-like compound elute off at the same time as the elution of the hydrotalcite-like compound. The acid substances that elute off again may have adverse influences on the oil. Accordingly, a further development is desired to be made so as to stably curb oil deterioration for a long period of time, using the hydrotalcite-like compound.

SUMMARY OF THE INVENTION

The invention provides an oil additive for stably curbing deterioration of oil over a long period of time, in an internal combustion engine, or the like, and an oil filter into which the oil additive is incorporated.

The inventors found that the use of a hydrotalcite-like compound along with a radical trapping agent as an oil additive enables oil to exhibit durability that cannot be expected from single use of the hydrotalcite-like compound, and developed the present invention.

One aspect of the invention provides an oil additive including a hydrotalcite-like compound, and a radical trapping agent having a melting point of 130° C. or higher.

Another aspect of the invention provides an oil filter including the oil additive as described above.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1A:
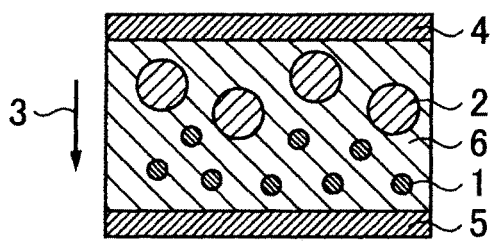
FIG. 1A to FIG. 1F are schematic views showing variations of the construction of filter media according to embodiments of the invention.

One embodiment of the invention will be described. It is to be understood that the following embodiment is a mere example of the invention, and various design changes, which would occur to those skilled in the art, may be made as needed.

The invention is concerned with an oil additive containing a hydrotalcite-like compound as a first additive or filtering material, and a radical trapping agent as a second additive or filtering material. The invention is also concerned with a filter media for an oil filter, which includes the oil additive. The invention is also concerned with an oil filter that includes the oil additive or the filter media.

(Hydrotalcite-Like Compound)

The oil additive of the invention contains a hydrotalcite-like compound.

The hydrotalcite-like compound is expressed in the following general formula (2).

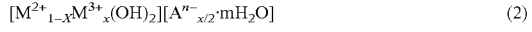

$$[M^{2+}_{1-x}M^{3+}_x(OH)_2][A^{n-}_{x/2} \cdot mH_2O] \qquad (2)$$

As is understood from the above formula (2), the hydrotalcite-like compound is a layered compound including framework layers composed of divalent metal ions $M^{2+}$ and trivalent metal ions $M^{3+}$ as main components, and anions $A^{n-}{}_{x/2}$ interposed between these layers. The hydrotalcite-like compound functions as an ion exchanger, and has the functions of adsorbing acid components in oil, and releasing anions instead.

The hydrotalcite-like compound may contain hydroxide ions ($OH^-$) and carbonate ions ($CO_3^{2-}$) as anionic components, between the above-described layers. When the hydrotalcite-like compound is in water or oil, the hydroxide ions and carbonate ions can be released from the hydrotalcite-like compound at the same time that the hydrotalcite-like compound traps or adsorbs anions.

According to the invention, a weakly basic hydrotalcite-like compound may be used as the hydrotalcite-like compound. The weakly basic hydrotalcite-like compound is a hydrotalcite-like compound having characteristics as follows: when a mixture of 1 wt. % of the hydrotalcite-like compound and water is added in an amount of 3 wt. % to oil whose hydrogen-ion exponent (pH) is in the range of 6 to 7 pH, which is then stirred, the resultant oil shows pH within the range of 6 to 7 pH. The weakly basic hydrotalcite-like compound is a hydrotalcite-like compound in which a mixture of 3 wt. % of hydrotalcite-like compound and water shows a hydrogen-ion exponent that is equal to or higher than 7 pH and equal to or lower than 10 pH.

The weakly basic hydrotalcite-like compound may have a composition of the following formula (3).

$$Mg_{8-x}Al_x(OH)_y(CO_3)_z \cdot mH_2O \qquad (3)$$

In the above formula (3), x is equal to or larger than 1 and equal to or smaller than 7, and y, z and m are positive rational numbers, while z is larger than y. Preferably, x is equal to or larger than 2 and equal to or smaller than 5.

An example of hydrotalcite-like compound which satisfies the above formula (3) is "$Mg_6Al_2(OH)(CO_3)_{16}$". The hydrotalcite-like compound can generally exist as a hydrate, which may be expressed as, for example, "$Mg_6Al_2(OH)(CO_3)_{16} \cdot mH_2O$ (where m is a positive rational number)".

The weakly basic hydrotalcite-like compound contains a relatively small quantity of hydroxide ions, and a relatively large quantity of carbonate ions. Therefore, the weakly basic hydrotalcite-like compound does not emit a large quantity of hydroxide ions in the oil. On the other hand, the weakly basic hydrotalcite-like compound emits carbonate ions, and most of the carbonate ions turn into a gas, such as carbon dioxide. Accordingly, the weakly basic hydrotalcite-like compound may be used along with another substance, such as ZnDTP, which hydrolyzes. In this connection, additives that hydrolyze include additives that produce acid substances on hydrolysis. Such additives produce acid substances, or acid-degraded products, such as $SO_4^{2-}$, $NO_3^-$, on hydrolysis. The hydrotalcite-like compound may be favorably used along with these additives.

According to the invention, a hydrotalcite-like compound having a composition other than that of the above formula (3) may be used. For example, a hydrotalcite-like compound containing a larger quantity of hydroxide ions than carbonate ions may be used. One example of the compound is "$Mg_6Al_2(CO_3)(OH)_{16}$".

The hydrotalcite-like compound used in this invention is preferably in a powder form or in the form of particles, though it may be in any form provided that the compound can adsorb acid substances in oil when it comes into contact with the oil. More specifically, the hydrotalcite-like compound consists of fine particles, of which the particle size is within the range of 0.001 mm to 1 mm. More preferably, each hydrotalcite-like compound may have a particle size of 0.1 mm to 1 mm. The particles of the hydrotalcite-like compound may be carried on a carrier, such as a non-woven fabric, and used. The hydrotalcite-like compound may not be in a powder form, but may be constructed as an integral block or body having a certain shape.

The additive of this invention may be used in oil that circulates within a lubricating device of an internal combustion engine (which will be simply called "engine"), or may be directly added to engine oil, or may be included in an oil filter of the engine. Therefore, the hydrotalcite-like compound of the invention is required to be resistant to the temperature of the engine oil during operation of the engine. More specifically, the hydrotalcite-like compound can be used in a temperature range of (for example, 0° C. or higher and) 160° C. or lower, more preferably, can be used at a temperature equal to or lower than 130° C.

In the engine, early deterioration of engine oil is likely to occur due to blow-by gas. The blow-by gas means gas that leaks out into the crankcase through a clearance between a piston ring of each piston of the engine and a cylinder bore of the cylinder block. The blow-by gas contains large quantities of hydrocarbon and moisture. Therefore, an excessively large amount of blow-by gas may cause early deterioration of engine oil and rust in the engine. Since the blow-by gas contains hydrocarbon, it is environmentally undesirable to release the blow-by gas to the atmosphere as it is. Thus, many engines are equipped with a device (not shown) for recirculating blow-by gas, and the blow-by gas is forced to return to an intake system via the inside of a head cover, for example, and is supplied to combustion chambers.

The blow-by gas as described above contains NOx, SOx, and moisture, for example. Since heat is less likely to be transmitted from the engine to the engine head cover, and the outer surface of the head cover is exposed to the outside air and cooled by cooling air, condensed water is likely to be formed due to dew condensation, or the like, on the inner surface of the head cover. Thus, in the head cover, in particular, acid substances, such as nitric acid and sulfuric acid, are likely to be formed through the reaction. These acid substances can be mixed with lubricating oil or engine oil, and can promote generation, attachment, and deposition of a sludge precursor and sludge within the engine.

On the other hand, the hydrotalcite-like compound has an ability to adsorb anions, and is thus able to adsorb acid substances, such as nitrate ions and sulfate ions, from within the oil. Accordingly, the hydrotalcite-like compound contributes to suppression of oil deterioration.

(Radical Trapping Agent)

The oil additive of the invention contains a radical trapping agent. The radical trapping agent is a compound that can trap free radicals that cause radical polymerization, or a mixture containing the compound. For example, an antioxidant, or the like, may be used as a radical trapping agent.

The compound that can be used as the radical trapping agent of the invention is required to be resistant to heat of engine oil during operation of the engine. More specifically, the radical trapping agent that can be used in the invention has a melting point of 130° C. or higher, preferably, a melting point of 160° C. or higher. Although the temperature is controlled in the engine so that the temperature of the oil does not exceed 130° C., the oil temperature may exceed 130° C., and rise to around 160° C. for a very short period of time, due to various internal or external factors.

The radical trapping agent of the invention is not limited to but may be selected from hindered phenol compounds having a high-temperature antioxidant (oxidation inhibiting)

characteristic, phosphite compounds, hindered amine light stabilizers and phosphorous non-combustible agents, for example. Two or more kinds of radical trapping agents may be used together.

The hindered phenol compounds that can be used in the invention are not limited to but include N,N'-hexane-1,6-diylbis[3-(3,5-di-tert-butyl-4-hydroxy phenyl) propion amide] (having a melting point of 156 to 161° C.: Compound A), 1,3,5-trimethyl-2,4,6-tris(3,5-di-tert-butyl-4-hydroxybenzyl)benzene (having a melting point of 240 to 245° C.: Compound B), 1,3,5-trimethyl-2,4,6-tris(3,5-di-tert-butyl-4-hy -droxybenzyl)-1,3,5-triazine-2,4,6-(1H,3H,5H)-trione (having a melting point of 219 to 226° C.: Compound C), and 2,2' -methylenebis[6-(benzotriazole-2-yl)-4-tert-octyl phenol] having a melting point of 194 to 200° C.: Compound D).

Also, a phosphite compound, such as phosphite tris(2,4-di-tert-butyl phenyl) (having a melting point of 180 to 190° C.: Compound E), may be used as a radical trapping agent of the invention.

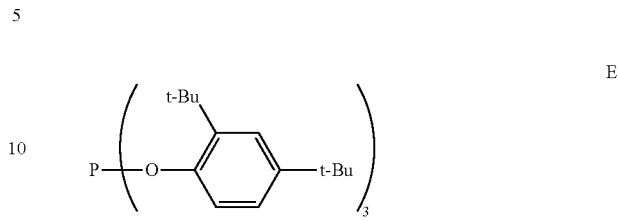

The radical trapping agent of the invention may be in any form provided that it has the function of removing radicals in the oil. Preferably, the radical trapping agent is in a powder form or in the form of particles. The particles of the radical trapping agent may be directly added into the oil, or may be carried by a carrier, such as a non-woven fabric, and used.

The radical trapping agent is used along with the above-described hydrotalcite-like compound. Since hydrotalcite has an elution property in oil, it has a tendency of releasing acid substances once adsorbed thereon when eluting. However, the radical trapping agent, which has an ability to prevent oxidation, is able to curb production of sludge or sludge precursor by the released acid substances. Thus, the radical trapping agent, which has an ability to curb oil deterioration, is used as an oil additive along with the hydrotalcite, so that the resulting oil additive exhibits a curbing effect on deterioration of oil for a prolonged period of time.

The relationship between the amount of the added radical trapping agent and the amount of the added hydrotalcite-like compound may be set by experiment as needed. For example, the addition ratio of the amount of the added hydrotalcite-like compound and the amount of the added radical trapping agent may be 1:1 or more, for example, 1:2 or more, in units of g, relative to 1 L of oil. More specifically, the hydrotalcite-like compound is added in an amount of 100 g or less, preferably, 2.5 g or less, to 1 L of oil, and the radical trapping agent is added in an amount of 2.5 g or more, preferably, 5 g or more, to 1 L of oil. The addition ratio of these additives may be set as needed since it can vary depending on the size (e.g., particle size) and surface area of each additive. This is also true with the case where these additives are used in filter media and oil filter, which will be described below.

The radical trapping agent and the hydrotalcite-like compound may also be used along with another additive or additives, for example, a basic compound, such as calcium carbonate. This is also true with the case where these additives are used in filter media and oil filter, which will be described below.

(Filter Media for Oil Filter)

FIG. 1A to FIG. 1F are schematic views showing variations of the construction of filter media according to some embodiments of the invention. Each filter media of FIG. 1A to FIG. 1F includes the hydrotalcite-like compound and the radical trapping agent, each of which is in the form of particles. In FIG. 1A to FIG. 1F, the positional relationship between particles 1 of the hydrotalcite-like compound and particles 2 of the radical trapping agent is schematically illustrated with respect to the flow 3 of oil that proceeds in the direction of an arrow. It is to be understood that the

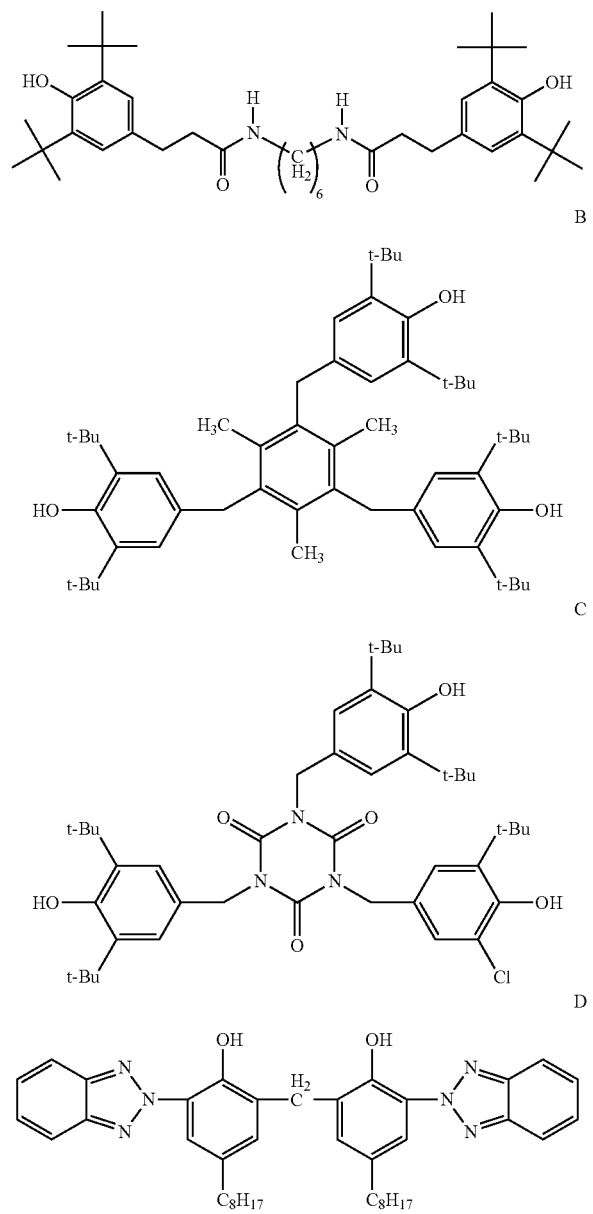

number of particles, size, and shape of each additive are not limited to those shown in FIG. 1A to FIG. 1F.

A filter paper member (or filter wall member) as will be described below has pores small enough to normally prevent the particles of the above-indicated additives from passing therethrough, and is preferably configured to provide a suitable degree of resistance to passage of the oil. The filter paper member is formed of a material, such as a chemical fiber material, that is suitable for use in oil. A non-fabric cloth member as will be described below is arranged to appropriately permit passage of oil therethrough while trapping the above-mentioned additive particles, and has a generally uniform configuration unless otherwise stated.

Figure 1B:
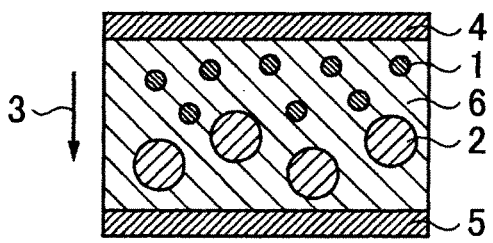
Figure 1C:
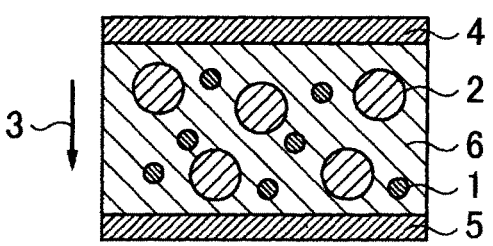

FIG. 1A shows a filter media in which the particles 2 of the radical trapping agent are placed on the upstream side, and the particles 1 of the hydrotalcite-like compound are placed on the downstream side. FIG. 1B shows a filter media in which the particles 1 of the hydrotalcite-like compound are placed on the upstream side, and the particles 2 of the radical trapping agent are placed on the downstream side. FIG. 1C shows a filter media in which the particles 1 of the hydrotalcite-like compound and the particles 2 of the radical trapping agent are mixed and placed at random. Each of the filter media of FIG. 1A to FIG. 1C has one non-fabric cloth member 6 sandwiched by and between filter paper members 4, 5, and is formed generally integrally such that the particles 1 of the hydrotalcite-like compound and the particles 2 of the radical trapping agent are trapped in the non-fabric cloth member 6. The non-fabric cloth member 6 may be formed as a combination of two or more non-fabric cloth members. Preferably, the particles 1 of the hydrotalcite-like compound and the particles 2 of the radical trapping agent are located relative to each other as shown in FIG. 1B. This is because the function of the particles 2 of the radical trapping agent is favorably performed on acid substances that may elute off in accordance with elution of the hydrotalcite-like compound.

Figure 1D:
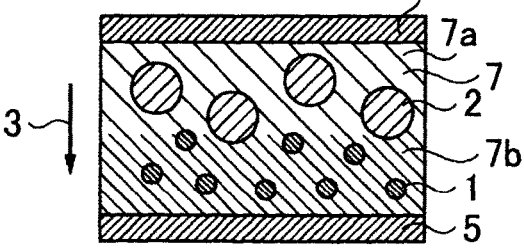

While the filter media of FIG. 1D has one non-fabric cloth member 7 between the filter paper members 4, 5, the non-fabric cloth member 7 is not uniform, but has a coarse portion 7a and a dense portion 7b. Although the boundary between the coarse portion 7a and the dense portion 7b seems to be clear to some extent in FIG. 1D, the boundary may not be clear, and the non-fabric cloth member 7 may be configured such that its density gradually varies. In the filter media of FIG 1D, the non-fabric cloth member 7 is set in position such that the coarse layer 7a is located on the upstream side, and the dense layer 7b is located on the downstream side. The particles 2 of the radical trapping agent are generally positioned in the coarse portion 7a, and the particles 1 of the hydrotalcite-like compound are positioned in the dense portion 7b. This is because the particles 2 of the radical trapping agent used herein are larger in size than the particles 1 of the hydrotalcite-like compound. Nonetheless, the present invention does not exclude the case where the size of the particles 2 is generally equal to or smaller than that of the particles 1. Since the oil tends to spread evenly in the dense layer 7b of the non-fabric cloth member 7, in view of pressure loss, the non-fabric cloth member can provide an excellent effect in terms of filtering of the oil. The above configuration of the non-fabric cloth member 7 may be achieved by combining two or more non-fabric cloth members having different configurations.

Figure 1E:
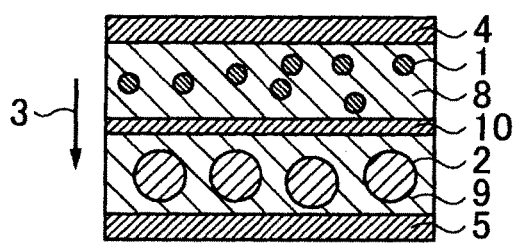

The filter media of FIG. 1E has two non-fabric cloth members 8, 9 between the filter paper members 4, 5, and has an additional filter paper member 10 between the non-fabric cloth members 8, 9. The particles 1 of the hydrotalcite-like compound are trapped in the first non-fabric cloth member 8, and the particles 2 of the radical trapping agent are trapped in the second non-fabric cloth member 9. The first non-fabric cloth member 8 and the second non-fabric cloth member 9 are separated from each other by the filter paper member 10. Accordingly, the arrangement of the filter media of FIG. 1E is advantageously used when it is desirable to separate the particles 1 of the hydrotalcite-like compound from the particles 2 of the radical trapping agent. The positional relationship between the particles 1 of the hydrotalcite-like compound and the particles 2 of the radical trapping agent in FIG. 1E corresponds to the positional relationship between the particles 1 and the particles 2 in FIG. 1B.

Figure 1F:
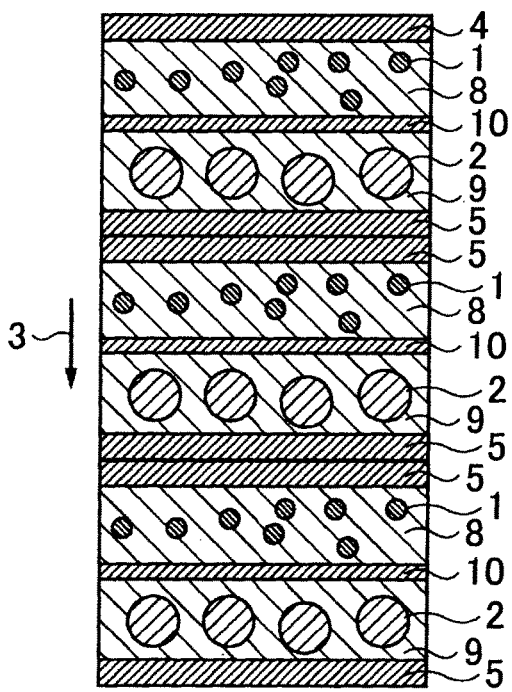

FIG. 1F shows a filter media laminate formed by connecting three pieces of filter media of FIG. 1E in series. A filter media laminate may also be formed by connecting two or four or more pieces of filter media. Various combinations of various filter media, such as the filter media of FIG. 1A through FIG. 1E, may be used.

(Oil Filter)

The invention is also concerned with an oil filter in which the filter media as described above is incorporated. More specifically, the oil filter may be selected from, for example, an oil filter including one or more filter media of FIG. 1A, an oil filter including one or more filter media of FIG. 1B, an oil filter including one or more filter media of FIG. 1C, an oil filter including one or more filter media of FIG. 1D, an oil filter including one or more filter media of FIG. 1E, and an oil filter including a given combination of these filter media of FIG. 1A to FIG. 1E.

Figure 2:
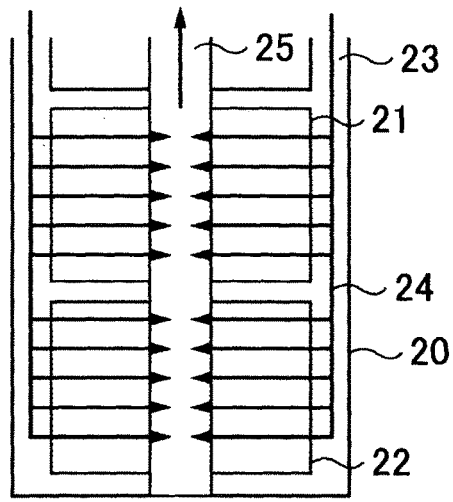
FIG. 2 is a schematic view showing the construction of an oil filter according to one embodiment of the invention.

FIG. 2 shows an oil filter as one embodiment of the invention. Those skilled in the art to which the invention pertains would understand that the oil filter in which the filter media of the invention is incorporated is not limited to this embodiment, but may be modified as needed in accordance with the status of use. The oil filter of the invention is preferably installed in an engine oil channel of an engine, more preferably, installed in an engine oil channel of an engine of a vehicle. The oil filter of the invention may be used in a machine other than engines.

The oil filter 20 of FIG. 2 has a first filter media 21 and a second filter media 22. The first filter media 21 has a hydrotalcite-like compound and a radical trapping agent, as shown in FIG. 1A to FIG. 1F. The second filter media 22 has filter paper made of cellulose, as a main component.

In FIG. 2, the flow of oil is schematically represented by arrows. The oil that enters the oil filter 2 through an inlet 23 is distributed according to pressure losses in oil passage channels or lines 24. As a result, the oil passes through one of the first filter media 21 and the second filter media 22, and returns to an oil channel of a machine, such as an engine, through an outlet 25.

The oil filter 20 may be divided into an oil filter including the first filter media 21 and an oil filter including the second filter media 22.

While some examples (or test results) of the invention will be described below, these examples are merely typical examples used for explaining this invention, and the invention is by no means limited to these examples.

In the following evaluation tests, the amount of sludge precursor was measured using an optical oil deterioration diagnostic device (see Japanese Patent Application Publication No. 2010-145107 (JP 2010-145107 A)). The acid number, total acid number, and the total base number were measured based on a method of measuring the neutralization number, as defined in JIS K2501.

(Evaluation Test 1)

Figure 3:
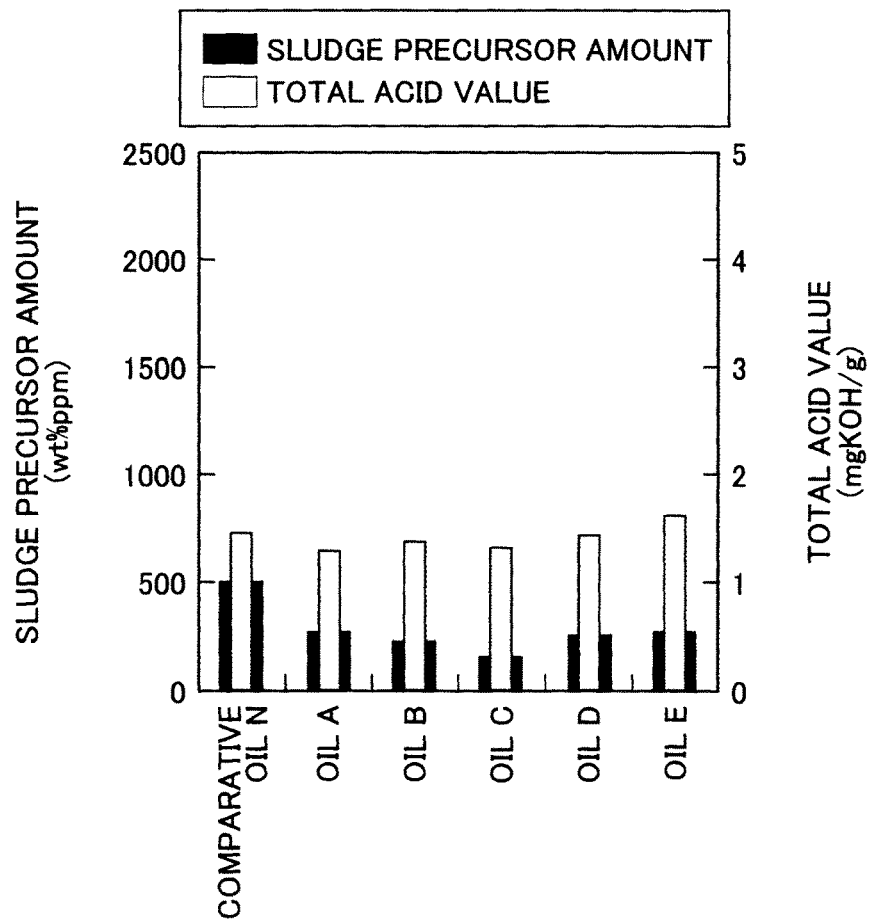
FIG. 3 is a graph indicating the amount of sludge precursor and the total acid number in Evaluation Test 1.
Figure 4:
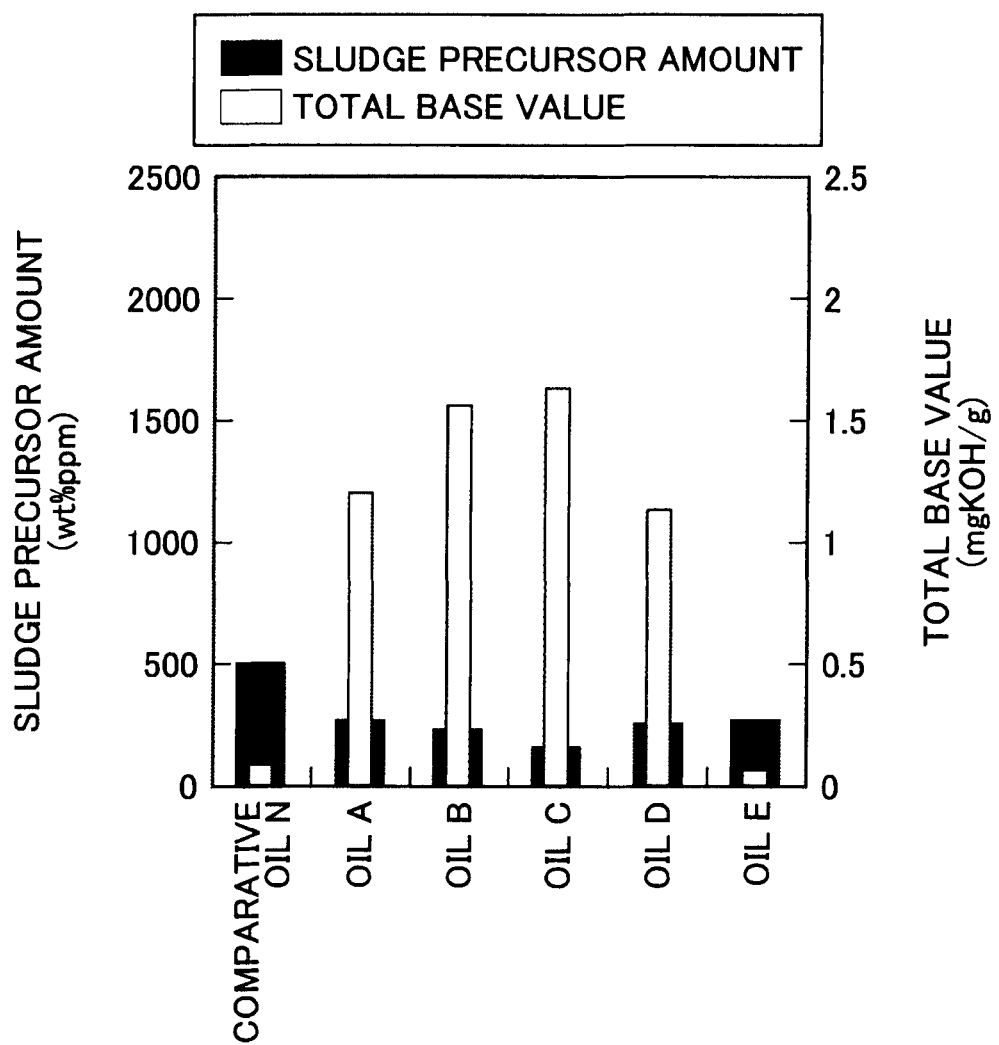
FIG. 4 is a graph indicating the amount of sludge precursor and the total base number in Evaluation Test 1.

To unused engine oil (CASTLE (registered trademark) manufactured by Toyota Motor Corporation: Standard Oil SL5W30), concentrated sulfuric acid was added in a concentration of 300 ppm, which corresponds to the amount of sulfuric acid that can be produced when the travel distance of the vehicle reaches 30,000 km. Further, particles of each of various radical trap agents as indicated above were added in an amount of about 5 g/L to the oil, and the resulting oil was stirred at 130° C. for 72 hours. In this manner, oil A to which the above-indicated compound A was added, oil B to which the above-indicated compound B was added, oil C to which the above-indicated compound C was added, oil D to which the above-indicated compound D was added, and oil E to which the above-indicated compound E was added, were obtained. Then, the amount of sludge precursor in the oil, the total acid number, and the total base number were measured with respect to each of oils A to E. The measurement results are shown in FIG. 3 and FIG. 4. In FIG. 3 and FIG. 4, the results of measurements on oil (comparative oil N) to which no radical trapping agent was added, under the same conditions, are indicated.

As shown in FIG. 3, reduction of the amount of sludge precursor was observed in all of oils A to E, as compared with the amount of sludge precursor in comparative oil N. In all of oils A to D, reduction of the total acid number relative to that of comparative oil N was observed. A significant difference was not observed between the total acid number of oil E and the total acid number of comparative oil N. This means that the compounds A to E have an ability to prevent oxidation in oil, and yield an effect of curbing production of the sludge precursor.

As shown in FIG. 4, the total base number that is larger than 0 was obtained in all of oils A to E. This means that the compounds A to E do not impede the function of a dispersant, such as linear alkylbenzene calcium sulfonate, added to the oil.

Accordingly, the test revealed that each of the compounds A to E is useful as an oil additive for curbing oil deterioration.

(Evaluation Test 2)

Figure 5:
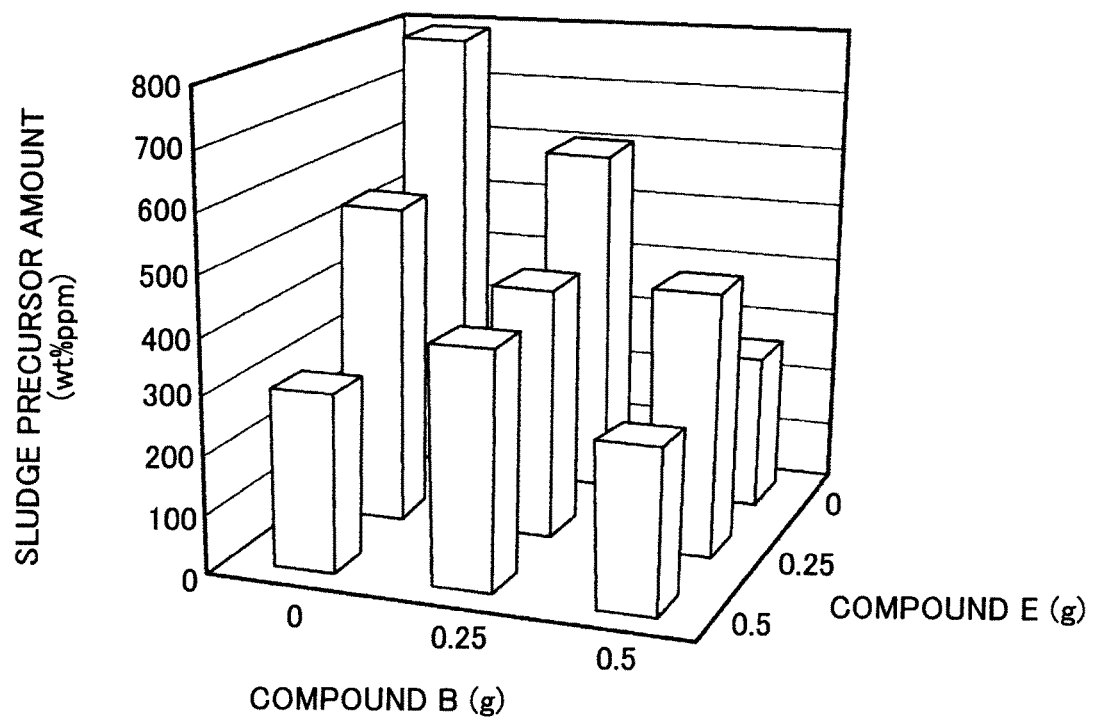
FIG. 5 is a graph indicating the amounts of radical trapping agents, and the amount of sludge precursor in Evaluation Test 2.
Figure 6:
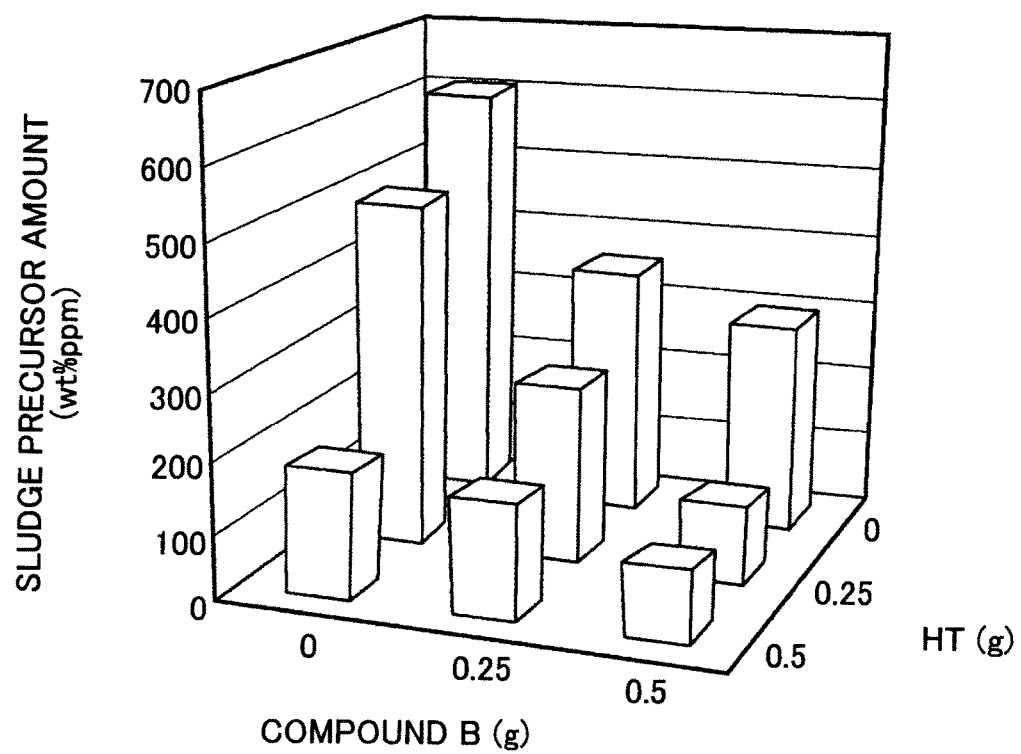
FIG. 6 is a graph indicating the amount of hydrotalcite-like compound, the amount of radical trapping agent, and the amount of sludge precursor, in Evaluation Test 2.
Figure 7:
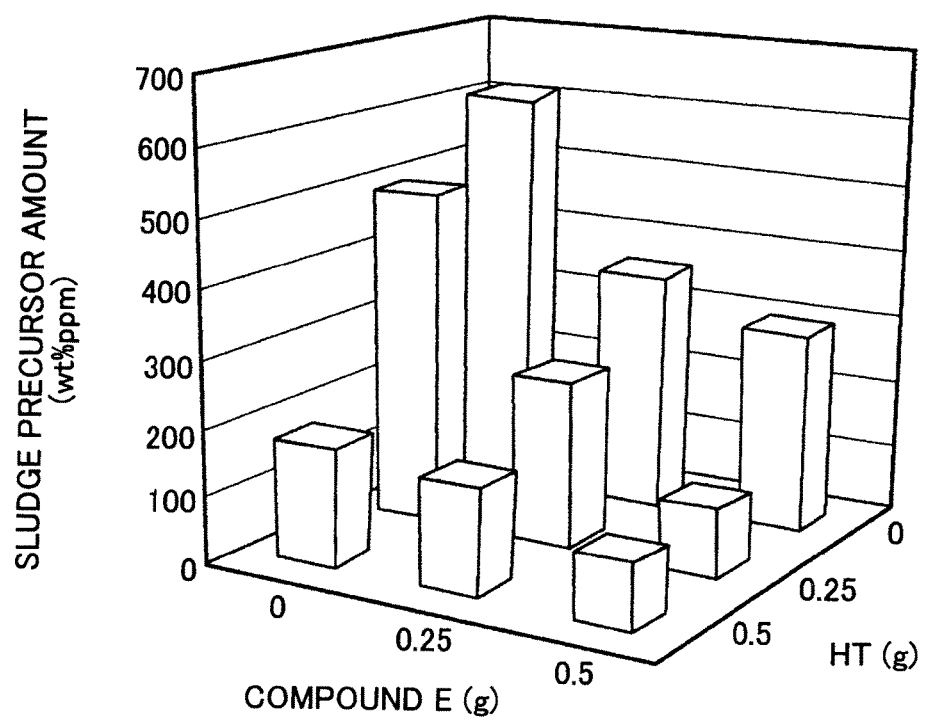
FIG. 7 is a graph indicating the amount of hydrotalcite-like compound, the amount of radical trapping agent, and the amount of sludge precursor, in Evaluation Test 2.

To the engine oil containing sulfuric acid in a concentration of 300 ppm, as used in the above evaluation test 1. particles of a hydrotalcite-like compound ($Mg_6Al_2(CO_3)(OH)_{16}$: manufactured by Wako Pure Chemical Industries, Ltd.) (which will be called "HT"), the compound B of radical trapping agent and/or the compound E of radical trapping agent, were added in amounts as indicated in FIG. 5 to FIG. 7 per 100 mL of the engine oil, and the resultant oil was stirred at 130° C. for 72 hours. Then, the amount of sludge precursor in the oil was measured. The measurement results are shown in FIG. 5 to FIG. 7.

Referring to FIG. 5 to FIG. 7, when a combination of the hydrotalcite-like compound and the radical trapping agent was used, the amount of sludge precursor produced was smaller, as compared with the case where one kind or two kinds of radical trapping agent(s) was/were simply used, and the case where only the hydrotalcite-like compound was simply used. Accordingly, it was revealed that the combination of the hydrotalcite-like compound and the compound of radical trapping agent has a remarkable ability to prevent oil deterioration.

(Evaluation Test 3)

Oil obtained by adding 10 mL of 0.5 normal sulfuric acid to unused engine oil (CASTLE (registered trademark) manufactured by Toyota Motor Corporation: Standard Oil SL5W30) was used as base oil. A first oil (NO ADDITIVE in FIG. 8) obtained by adding nothing to the base oil, a second oil (HT in FIG. 8) obtained by adding particles of HT, or hydrotalcite-like compound, used in the above evaluation test 2. to the first oil in an amount of 150 g/L, and a third oil (HT+COMPOUND B in FIG. 8) obtained by adding an additive as a 1:1 mixture of the same hydrotalcite-like compound and the compound B of radical trapping agent in the form of particles, to the first oil, in an amount of 150 g/L, were prepared. Each of the first through third oils was stirred at 130° C. for varying periods of time shown in FIG. 8, and the amount of sludge precursor in each of the oils was measured. The measurement results are shown in FIG. 8.

Figure 8:
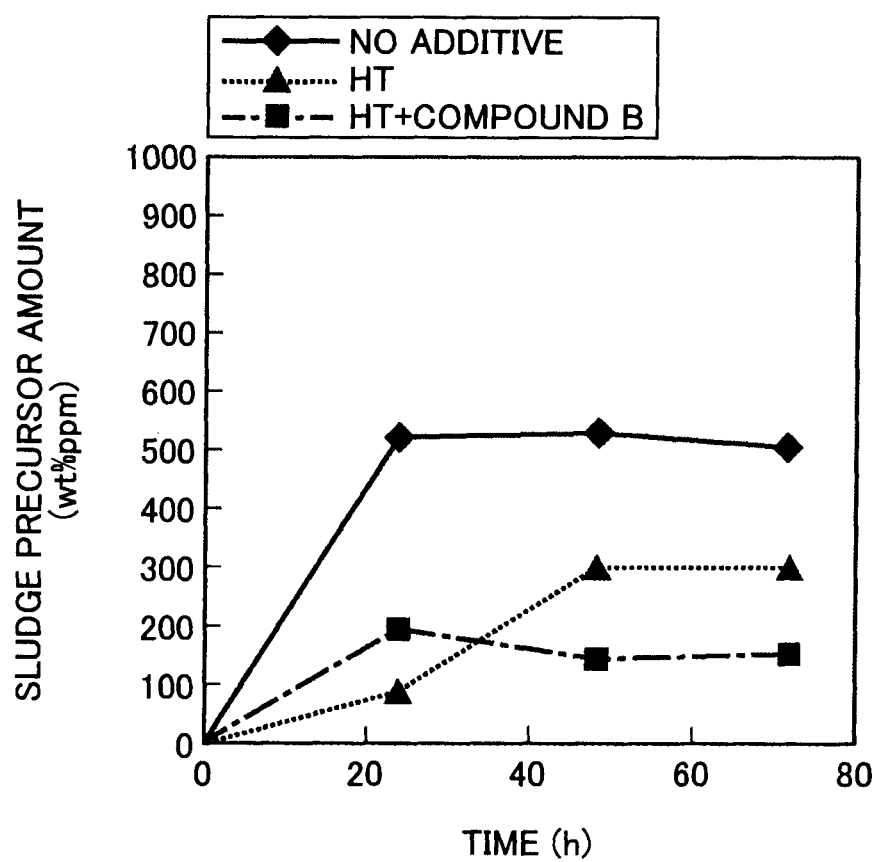
FIG. 8 is a graph indicating changes in the amount of sludge precursor with time, in Evaluation Test 3.

Referring to FIG. 8, production of the sludge precursor can be significantly curbed only through addition of the hydrotalcite-like compound. In this case, however, the amount of sludge precursor produced was likely to increase with the passage of time. On the other hand, in the third oil to which the combination of the hydrotalcite-like compound and the compound B of radical trapping agent was added, the amount of sludge precursor produced could be kept small for a long period of time. In this case, in particular, the amount of sludge precursor produced had no tendency to increase even if the test time became longer. Accordingly, the combination of the hydrotalcite-like compound and the radical trapping agent, when added to the oil used under high temperature, as in an engine, would stably exhibit an effect of curbing oil deterioration for a prolonged period of time.

(Evaluation Test 4)

The combination of the hydrotalcite-like compound and the radical trapping agent was evaluated in a test using an actual machine. The test results are shown in FIG. 9 and FIG. 10.

In this test, the compound of the above evaluation test 2 was used as the hydrotalcite-like compound, and the above-indicated compound E was used as the compound of radical trapping agent. An oil filter including these two kinds of compound particles in given amounts at a given ratio, and an oil filter including a given amount of particles of the compound E but not including the hydrotalcite-like compound were fabricated. Each of these oil filters was installed in an oil channel of a lubricating device of an engine, and the engine was operated under general conditions for running in the city. Then, the amount of sludge precursor in the oil of the engine was measured.

Figure 9:
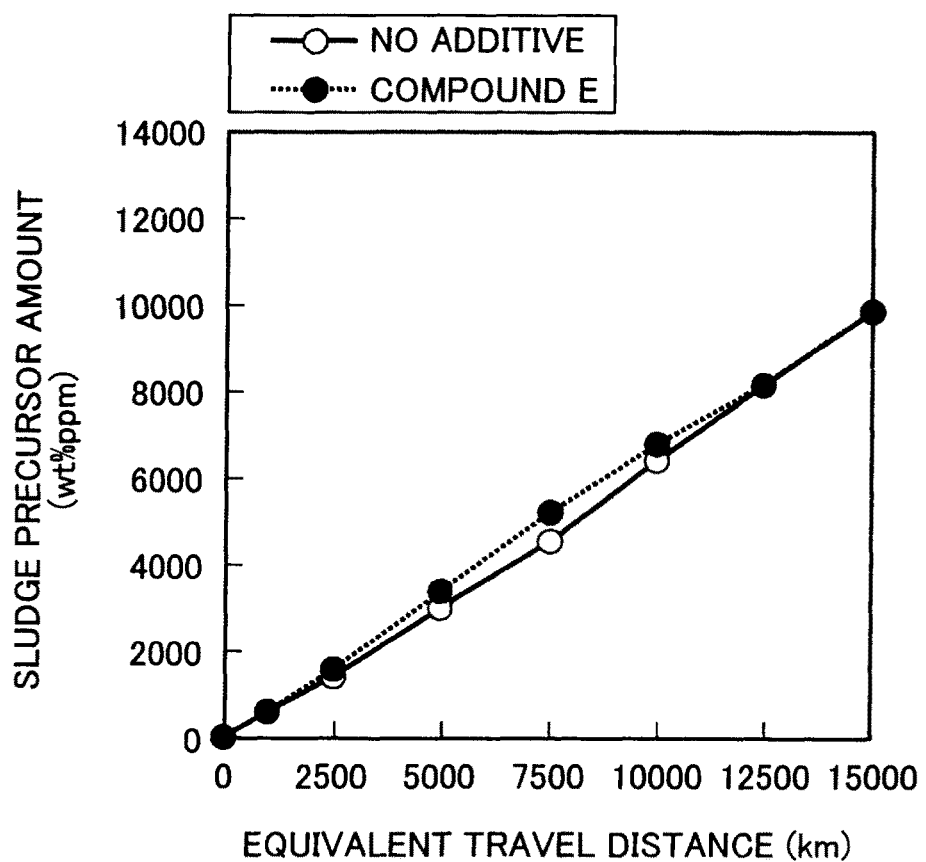
FIG. 9 is a graph indicating changes in the amount of sludge precursor when a radical trapping agent is added to oil, in Evaluation Test 4.
Figure 10:
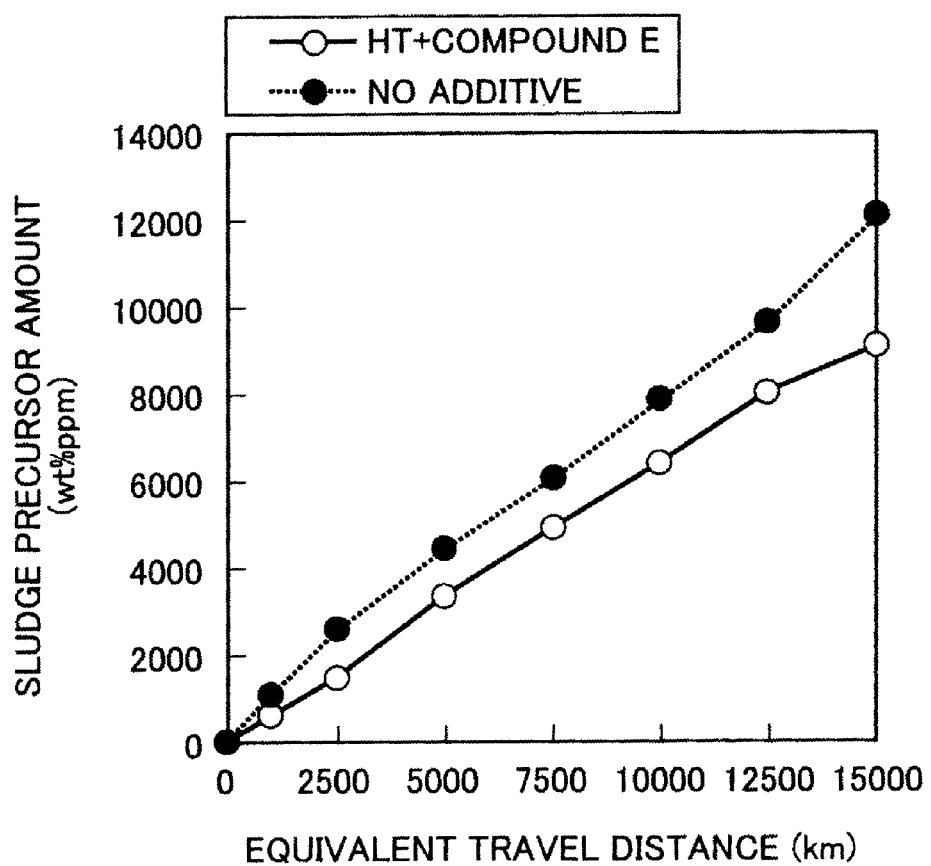
FIG. 10 is a graph indicating changes in the amount of sludge precursor when a radical trapping agent and a hydrotalcite-like compound are added to oil, in Evaluation Test 4.

As shown in FIG. 9, the amount of sludge precursor produced varied (increased) in similar ways as the equivalent travel distance increased, in the case where no hydrotalcite-like compound and no compound of radical trapping agent were used (NO ADDITIVE in FIG. 9), and the case where only the compound E of radical trapping agent was used without using the hydrotalcite-like compound (COMPOUND E in FIG. 9). On the other hand, as shown in FIG. 10, when the hydrotalcite-like compound (HT) and the compound E of radical trapping agent were used in combination (HT+COMPOUND E in FIG. 10), it was found that the amount of sludge precursor produced increased at a reduced rate as the equivalent travel distance increased, and production of the sludge precursor was favorably curbed or retarded, as compared with the case where no hydrotalcite-like compound and no compound of radical trapping agent were used (NO ADDITIVE in FIG. 9 and FIG. 10). This made it clear that oil deterioration can be favorably curbed by adding the combination of the hydrotalcite-like compound and the compound of radical trapping agent, to the engine oil, or installing the oil filter having both of the hydrotalcite-like compound and the compound of radical trapping agent in the oil channel of the lubricating device of the engine.

(Evaluation Test 5)

Figure 11:
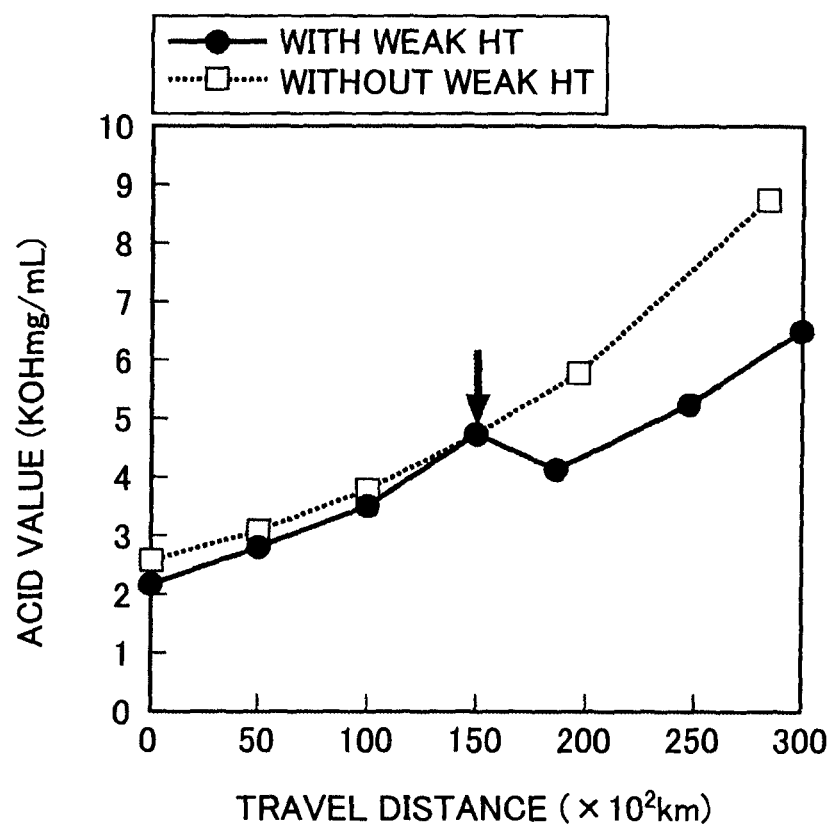
FIG. 11 is a graph indicating changes in the acid number when a hydrotalcite-like compound is added to oil, in Evaluation Test 5.

An additional actual-machine test was conducted, and the results of the test are shown in FIG. 11.

In this test, a hydrotalcite-like compound having a composition of "$Mg_6Al_2(OH)(CO_3)_{16}$" (manufactured by Wako Pure Chemical Industries, Ltd., hereinafter called "weak HT"), which is different from the compound of the above evaluation test 2. was used as the hydrotalcite-like compound, and the effect of curbing sludge production in oil, when the weak HT was used, was evaluated.

In this test, an oil filter containing a given amount of weak HT particles was fabricated, and incorporated into an engine of a vehicle that traveled a given distance. Specifically, 80 g of powder of weak HT having the average particle size of 5 to 15 μm was received in the oil filter used in the experiment. Then, the oil filter was introduced into an experimental vehicle when the travel distance of the experimental vehicle in the city reached 15,000 km.

FIG. 11 shows changes in the acid number of the oil in the engine of the experimental vehicle in the case (WITH WEAK HT) where the oil filter having weak HT was introduced into the experimental vehicle that traveled the given distance (15,000 km), relative to the travel distance. FIG. 11 also shows changes in the acid number of the oil in the engine of the experimental vehicle in the case (WITHOUT WEAK HT) where the oil filter having weak HT was not introduced into the experimental vehicle. In FIG. 11, the distance at which the oil filter was introduced is indicated by an arrow.

As is apparent from FIG. 11, the acid number of the oil increased as the travel distance increased. When the oil filter having weak HT was introduced, the acid number of the oil was reduced immediately after the introduction, and the rate of subsequent increase in the acid number of the oil was reduced. Thus, the introduction of weak HT into the oil of the lubricating device of the engine contributes to reduction of the acid number in the oil, and thus curbs production of sludge, for example.

It is thus possible to favorably curb deterioration of oil, even with the use of hydrotalcite-like compounds having compositions other than that of the hydrotalcite-like compound used in the above evaluation test 2. The hydrotalcite-like compounds having various compositions may be used with the radical trapping agent, whereby oil deterioration can be curbed over a prolonged period of time.

In the above examples 2 to 4 (evaluation tests 2 to 4), the compound B was used as a typical example of hindered phenol compound, and the compound E was used as a typical example of phosphite compound. The experimental results concerning the compounds B, E are compatible with those concerning various radical trapping agents according to the invention. In particular, the experimental results concerning the compound B may be regarded as experimental results concerning the compounds A, C, D, in view of the structures of the compounds A, C, D.

The present invention has been described above based on the embodiments, examples, and modified examples thereof. It is, however, to be understood that the invention is not limited to these embodiment and examples, but is allowed to be otherwise embodied. The invention includes all modified examples, applications, and equivalents, which are embraced by the concept or principle of the invention as defined in the appended claims.

What is claimed is:

1. A filter media for an oil filter, the filter media comprising:
    a hydrotalcite compound; and
    a radical trapping agent having a melting point of 130° C. or higher,
    wherein the hydrotalcite compound is a composition of the following formula

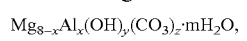
    $Mg_{8-x}Al_x(OH)_y(CO_3)_z \cdot mH_2O$, wherein x is equal to or larger than 1 and equal to or smaller than 7,
    y, z and m are positive rational numbers,
    z is larger than y,
    the radical trapping agent is 2,2'-methylenebis[6-(benzotriazole-2-yl)-4-tert-octyl phenol].

2. The filter media according to claim 1, wherein the hydrotalcite compound is in form of particles.

3. The filter media according to claim 1, wherein the radical trapping agent is in form of particles.

4. The filter media according to claim 1, wherein the melting point of the radical trapping agent is equal to or higher than 160° C.

5. The filter media according to claim 1, wherein:
    particles of the radical trapping agent are placed on an upstream side of the filter media; and
    particles of the hydrotalcite compound are placed on a downstream side of the filter media.

6. The filter media according to claim 1, wherein:
    particles of the hydrotalcite compound are placed on an upstream side of the filter media; and
    particles of the radical trapping agent are placed on a downstream side of the filter media.

7. The filter media according to claim 1, wherein particles of the hydrotalcite compound and particles of the radical trapping agent are mixed and placed at random in the filter media.

8. An oil filter comprising the filter media according to claim 1.

9. An internal combustion engine, comprising:
    the oil filter according to claim 8.

10. An engine oil channel, comprising:
    the oil filter according to claim 8.

* * * * *

UNITED STATES PATENT AND TRADEMARK OFFICE
CERTIFICATE OF CORRECTION

PATENT NO. : 10,112,132 B2
APPLICATION NO. : 14/373398
DATED : October 30, 2018
INVENTOR(S) : Ippei Fukutomi et al.

It is certified that error appears in the above-identified patent and that said Letters Patent is hereby corrected as shown below:

On the Title Page

Item (73), after "Assignee:" please change:
"TOYOTA JIDOSHA KABUSHIKI KAISHA"
To:
-- TOYOTA JIDOSHA KABUSHIKI KAISHA, Toyota-shi (JP);
TOYOTA BOSHOKU KABUSHIKI KAISHA, Kariya-shi (JP) --

Signed and Sealed this
Second Day of July, 2019

Andrei Iancu
*Director of the United States Patent and Trademark Office*